US011539739B2

(12) United States Patent
Doron et al.

(10) Patent No.: US 11,539,739 B2
(45) Date of Patent: *Dec. 27, 2022

(54) DETECTION AND MITIGATION OF FLOOD TYPE DDOS ATTACKS AGAINST CLOUD-HOSTED APPLICATIONS

(71) Applicant: RADWARE, LTD., Tel Aviv (IL)

(72) Inventors: Ehud Doron, Moddiin (IL); Nir Ilani, Givat Brenner (IL); David Aviv, Tel Aviv (IL); Yotam Ben Ezra, Raanana (IL); Amit Bismut, Kiryat Motzkin (IL); Yuriy Arbitman, Raanana (IL)

(73) Assignee: RADWARE, LTD., Tel Aviv (IL)

( * ) Notice: Subject to any disclaimer, the term of this patent is extended or adjusted under 35 U.S.C. 154(b) by 638 days.

This patent is subject to a terminal disclaimer.

(21) Appl. No.: 15/685,484

(22) Filed: Aug. 24, 2017

(65) Prior Publication Data

US 2018/0255094 A1 Sep. 6, 2018

Related U.S. Application Data

(60) Provisional application No. 62/467,534, filed on Mar. 6, 2017.

(51) Int. Cl.
*H04L 9/40* (2022.01)
*H04L 67/02* (2022.01)
(52) U.S. Cl.
CPC ...... *H04L 63/1458* (2013.01); *H04L 63/0209* (2013.01); *H04L 63/101* (2013.01);
(Continued)
(58) Field of Classification Search
CPC ............ H04L 63/1458; H04L 63/1416; H04L 63/0209; H04L 63/101
See application file for complete search history.

(56) References Cited

U.S. PATENT DOCUMENTS 8,100,039 B2   1/2012  Gass
8,613,089 B1 * 12/2013  Holloway ........... H04L 63/0281
                                                        726/23
(Continued)

OTHER PUBLICATIONS

Shahresani et al., "Visualization of invariant bot behavior for effective botnet traffic detection," 2012 International Symposium on Telecommunication Technologies Year: 2012 | Conference Paper | Publisher: IEE.*

(Continued)

*Primary Examiner* — Roderick Tolentino
(74) *Attorney, Agent, or Firm* — M&B IP Analysts, LLC

(57) ABSTRACT

A system and method for protecting cloud-hosted applications against hypertext transfer protocol (HTTP) flood distributed denial-of-service (DDoS) attacks are provided. The method includes collecting telemetries from a plurality of sources deployed in at least one cloud computing platform hosting a protected cloud-hosted application; providing at least one rate-based feature and at least one rate-invariant feature based on the collected telemetries, wherein the rate-based feature and the rate-invariant feature demonstrate behavior of at least HTTP traffic directed to the protected cloud-hosted application; evaluating the at least one rate-based feature and the at least one rate-invariant feature to determine whether the behavior of the at least HTTP traffic indicates a potential HTTP flood DDoS attack; and causing execution of a mitigation action when an indication of a potential HTTP flood DDoS attack is determined.

24 Claims, 6 Drawing Sheets

(52) U.S. Cl.
CPC ...... *H04L 63/1416* (2013.01); *H04L 63/1425* (2013.01); *H04L 63/20* (2013.01); *H04L 67/02* (2013.01); *H04L 2463/141* (2013.01)

(56) References Cited

U.S. PATENT DOCUMENTS

| | | | |
|---|---|---|---|
| 8,739,244 B1* | 5/2014 | Wu | H04L 69/04 |
| | | | 709/220 |
| 8,843,645 B2 | 9/2014 | Annamalaisami et al. | |
| 9,462,010 B1* | 10/2016 | Stevenson | H04L 63/1433 |
| 9,729,414 B1 | 8/2017 | Oliveira et al. | |
| 2008/0083029 A1 | 4/2008 | Yeh et al. | |
| 2011/0010463 A1 | 1/2011 | Christenson et al. | |
| 2012/0124666 A1* | 5/2012 | Kim | H04L 63/1458 |
| | | | 726/23 |
| 2012/0216282 A1* | 8/2012 | Pappu | H04L 47/80 |
| | | | 726/23 |
| 2012/0272289 A1* | 10/2012 | Chang | H04L 67/2819 |
| | | | 726/1 |
| 2012/0324573 A1 | 12/2012 | Kim et al. | |
| 2013/0055375 A1* | 2/2013 | Cline | H04L 63/14 |
| | | | 726/13 |
| 2013/0333029 A1 | 12/2013 | Chesla et al. | |
| 2014/0109225 A1 | 4/2014 | Holloway et al. | |
| 2014/0157405 A1* | 6/2014 | Joll | H04L 63/1425 |
| | | | 726/22 |
| 2014/0215621 A1 | 7/2014 | Xaypanya et al. | |
| 2014/0283051 A1 | 9/2014 | Doron et al. | |
| 2014/0304817 A1 | 10/2014 | Kim et al. | |
| 2014/0331304 A1 | 11/2014 | Wong | |
| 2016/0127408 A1 | 5/2016 | Miu et al. | |
| 2016/0359861 A1* | 12/2016 | Manov | H04L 63/102 |

OTHER PUBLICATIONS

Kiran et al., "Mining Concept Drifting Network Traffic in Cloud Computing Environments," 2012 12th IEEE/ACM International Symposium on Cluster, Cloud and Grid Computing (ccgrid 2012) Year: 2012 | Conference Paper | Publisher: IEEE.*

Dickerson, et al., "Fuzzy Network Profiling for Intrusion Detection," 2000, Ames, Iowa, IEEE Xplore.

* cited by examiner

DETECTION AND MITIGATION OF FLOOD TYPE DDOS ATTACKS AGAINST CLOUD-HOSTED APPLICATIONS

CROSS-REFERENCE TO RELATED APPLICATIONS

This application claims the benefit of U.S. Provisional Application No. 62/467,534 filed on Mar. 6, 2017, the contents of which are hereby incorporated by reference.

TECHNICAL FIELD

This disclosure relates generally to cyber-security systems and, more specifically, to techniques for the detection of flood type DDoS attacks in an out-of-path environment.

BACKGROUND

With the increasing use of computers in modern society, computer systems have become increasingly subject to cyber-attacks intended to disrupt systems, steal data, cause application defacement, manipulate behavior, or a combination of these goals. Accordingly, the field of cyber security has developed to combat such cyber-attacks. Cyber security is particularly important in cloud computing platforms, where multiple computer resources interact remotely in order to provide services, e.g., sharing of files and applications. Organizations have increasingly adapted their applications to be run from multiple cloud computing platforms, either completely or via hybrid implementations (i.e., such that part of the application is implemented on the premises of an enterprise data center and another part of the application is hosted in one or more public cloud networks). This makes the defending of public cloud-hosted applications much more complex, as the applications are hosted in multiple public cloud locations.

Some leading public cloud service providers include Amazon®, Microsoft®, Google®, Oracle®, Hewlett-Packard®, and so on. To ensure their services are not interrupted, these service providers must protect their customers against cyber security threats. In most cases, providers offer solutions to protect their infrastructure against cyber-attacks.

As more organizations migrate to the cloud, attackers have begun targeting cloud computing platforms and applications hosted therein more frequently, as evidenced by an increasing number of attacks directed to cloud computing assets. Further, to carry out more advanced attacks, attackers have begun combining multiple cyber security threat techniques into a single attack, thereby increasing the likelihood of bypassing defenses. Moreover, cyber security requirements are becoming even more rigorous as attacks become more sophisticated, more vicious, longer lasting, and occur in higher volumes and velocity.

Recently, some services have been developed to provide new security defense services to protect cloud hosted applications. However, such services may be limited in their capabilities and designed to protect cloud applications only in a specific platform where such applications reside. For example, Amazon® offers security services to cloud applications, but such services are restricted to applications that are only hosted in an Amazon cloud via the Amazon Web Services® platform. This is a limiting factor, as cloud hosted applications of a specific tenant (customer) can be executed on-premises and/or in multiple cloud platforms.

Therefore, even when an optimal defense would have been available by a cloud service provider, the defense is limited to one platform and cannot provide protection across platforms. For example, there is currently no security service offered by a cloud service provider that can protect a hybrid execution of a cloud application that is run in both an on-premises datacenter and an Amazon® cloud.

Current cyber-security solutions are limited by their ability to detect and mitigate Distributed Denial-of-Service (DDoS) attacks executed against cloud hosted applications, and particularly a hybrid execution of such applications. One instance of a DDoS attack is carried out by many attackers sending a large amount of data to a target entity, so that a service provided by the target entity may become unavailable.

Traditionally, DDoS attacks have been performed at the or network layer (layer-3/layer-4), through Transmission Control Protocol (TCP), User Datagram Protocol (UDP), Internet Control Message Protocol (ICMP) packets flooding with the aim of consuming network resources, such as network bandwidth, processors, or memory. Such L3/L4 cyber-attacks can be efficiently detected and mitigated using available in-line anti-DDoS solutions. DDoS attacks can also be carried out through application-layer (layer-7 or L7) protocols, such as Hypertext Transfer Protocol (HTTP).

One type of L7 DDoS attack is known as a "Flood HTTP DDoS." This is a type of denial of service (DoS) attack where a victim machine (e.g., a web server) is targeted by a large number of HTTP requests. The volume of the requests, or their subsequent responses, may be high or low. Flood attacks are typically carried out by bots. Each bot (e.g., a computer or an Internet of Things (IoT) device) generates valid and legitimate-appearing HTTP requests, such as GET or POST requests. A GET request may be used to retrieve standard, static content such as images hosted on the server, while a POST request is used to access dynamically generated resources. The HTTP requests can be generated over a single or multiple TCP connections or Internet Protocol (IP) packets. Causing a web server to serve processing-intensive requests will overload the sever and make it unavailable for other uses.

As of today, two possible categories of HTTP Flood attacks have been detected. In a first instance, many small-size HTTP requests for a "common" web resources are sent. This is performed to attack the ingress processing path at a web server hosting such a resource. In a second instance, a large-size web resource (e.g., a video clip) is targeted and many HTTP requests requesting these web sources are selected. That is, attacking the egress processing path at the web server hosting this resource.

Another type of flood DDoS attack is known as a "TCP flood DDoS attack." Here, the attacking bot simultaneously generates many valid and legitimate-appearing TCP sessions with a victim web server. Causing a web server to concurrently maintain many open TCP connections will overload the sever and make it unavailable for other uses.

Because flood HTTP and TCP DDoS attacks employ legitimate-appearing requests from a server, it is difficult to differentiate such requests from valid traffic. Thus, such types of DDoS attacks are among the most advanced non-vulnerability security challenges facing servers and applications today.

Current solutions merely provide detection for application layer attacks using in-line security systems. For example, conventional systems attempt to profile all traffic incoming to a protected web server to detect abnormal activity. However, such solutions can operate only as an in-line deployment and not in out-of-path deployments, mainly due to the inability to gain layer-7 telemetry required for such deployments. Other solutions for preventing HTTP flood attacks include implementing security challenges (e.g., script parsing). However, such solutions set restrictions that negatively affect legitimate users.

It would therefore be advantageous to provide a solution for detecting application layer flood DDoS attacks in out-of-path environments.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a system and method for protecting cloud-hosted applications against hypertext transfer protocol (HTTP) flood distributed denial-of-service (DDoS) attacks. The method comprises collecting telemetries from a plurality of sources deployed in at least one cloud computing platform hosting at least one protected cloud-hosted application; providing at least one rate-based feature and at least one rate-invariant feature based on the collected telemetries, wherein the rate-based feature and the rate-invariant feature demonstrate behavior of at least HTTP traffic directed to the protected cloud-hosted application; evaluating the at least one rate-based feature and the at least one rate-invariant feature to determine whether the behavior of the at least HTTP traffic indicates a potential HTTP flood DDoS attack; and causing execution of a mitigation action when an indication of a potential HTTP flood DDoS attack is determined.

Certain embodiments disclosed herein also include a system and method for method for protecting cloud-hosted applications against transmission control protocol (TCP) flood distributed denial-of-service (DDoS) attacks. The comprises collecting telemetries from a plurality of sources deployed in at least one cloud computing platform hosting a protected cloud-hosted application; providing at least one rate-based feature and at least one rate-invariant feature based on the collected telemetries, wherein the rate-based feature and the rate-invariant feature demonstrate behavior of at least TCP connections established with a server hosting the at least one protected cloud-hosted application; evaluating the at least one rate-based and the at least one rate-invariant feature to determine whether their behavior indicates a potential TCP flood DDoS attack; and causing execution of a mitigation action, when an indication of a potential TCP flood DDoS attack is determined.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
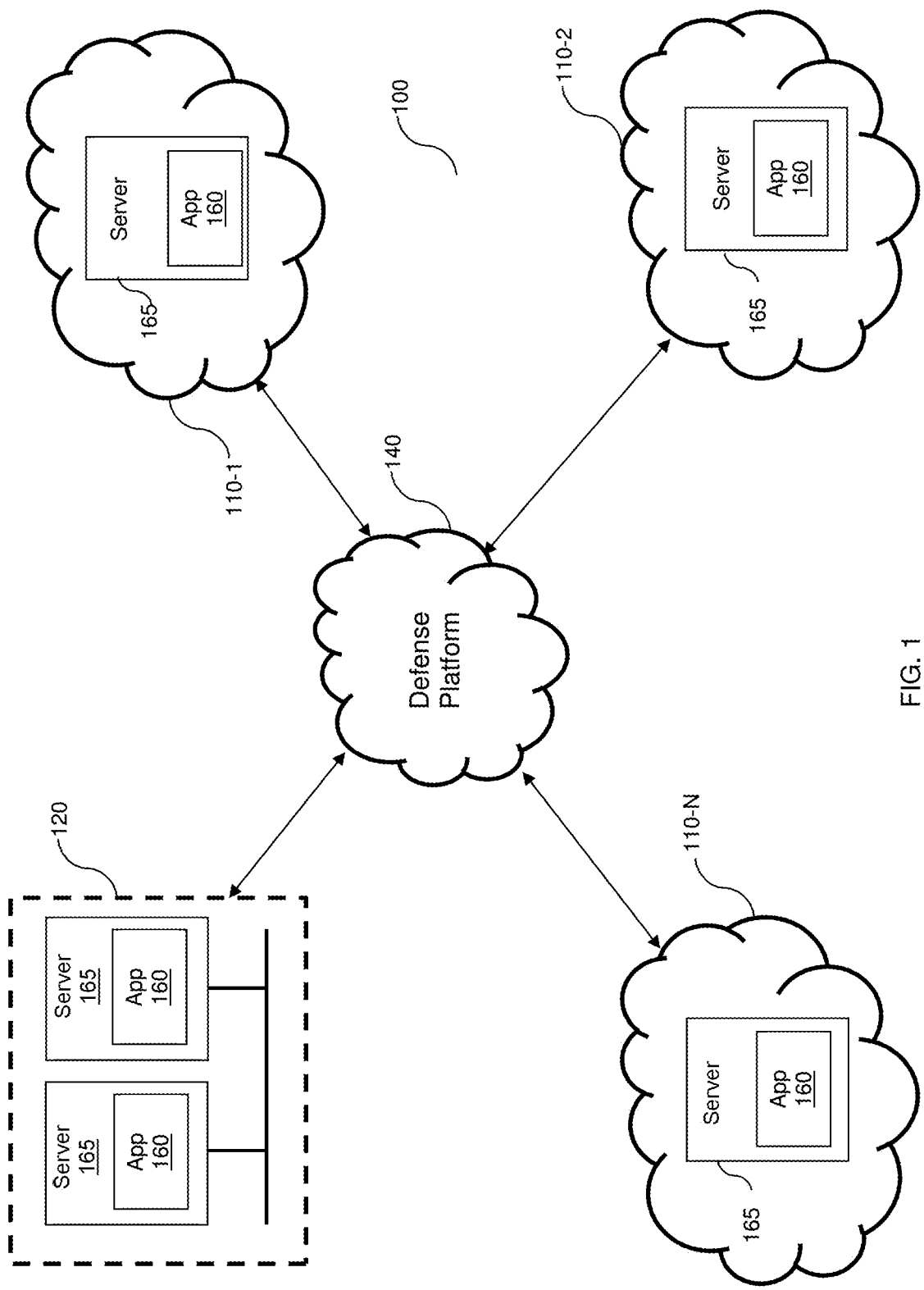
FIG. 1 is a network diagram of a multi-cloud architecture utilized to describe the various disclosed embodiments

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some embodiments disclosed herein include a system and method for detecting flood DDoS attacks, and, in particular, HTTP and TCP flood DDoS attacks. In an embodiment, the disclosed method and system protects cloud-hosted applications or web-hosted applications (hereinafter "protected applications" or "a protected application") hosted in a cloud computing infrastructure. A protected application may be distributed in multiple cloud-computing platforms and/or data centers located at the customer premises.

The protection is performed in an out-of-path deployment, that is, traffic directed to the protected application is neither received nor processed by the disclosed system. In an embodiment, the detection is based on a set of rate-based and rate-invariant features extracted from telemetries received from multiple sources. The telemetry relates to the protected application incoming and outgoing applicative behaviors, i.e., the behavior of the protected application.

Upon detection of a potential flood DDoS attack, the traffic associated with the attack is redirected to a mitigation resource such as, e.g., a scrubbing center. The clean traffic is returned to the original protected application(s) at the cloud computing platform, or to any another embodiment of the data center.

It should be noted that mitigation can also be performed in a cloud computing platform acting as a defense platform. The disclosed embodiments are also designed to protect a hybrid-execution of a cloud-hosted application, i.e., a cloud application being hosted in a multiple-cloud architecture as illustrated in FIG. 1.

FIG. 1 is an example network diagram of a multi-cloud architecture 100 utilized to describe the various disclosed embodiments. The multi-cloud architecture 100 includes a plurality of cloud computing platforms 110-1 through 110-N (where N is an integer greater than 1), a datacenter 120, and a defense platform 140. Each cloud computing platform may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, the cloud computing platform may serve as infrastructure-as-a-service (IaaS), Platform-as-a-Service (PaaS), Function as a Service (FaaS), or a combination thereof. The datacenter 120 may be an on-premises datacenter. It should be noted that embodiments disclosed herein can support multiple datacenters.

Each of the cloud computing platforms 110-1 through 110-N, and the datacenter 120 executes a protected application 160 which is the protected entity. As noted above, a protected application 160 may be a web application, a cloud hosted application, or any other software application or software resource executed by a server. Examples of a protected application 160 may include an email service, an e-commerce application, a financial application, a mobile application, an Internet of Things (IoT) application, a storage service, a content streaming service, a company Website, or any other service or application that can be accessed by a web browser (not shown).

Often, the protected applications 160 are associated with the same tenant (customer). Typically, the execution of the cloud hosted application is performed by a server (collectively shown as servers 165). Each server 165 may be a virtual machine or a physical machine. A virtual machine may include any virtual environment for executing code or applications.

The protection of the application 160 hosted in the multi-cloud architecture 100 against flood DDoS attacks is performed by means of the defense platform 140. In an embodiment, the defense platform 140 is a cloud computing platform managed by a cloud security vendor (or managed security service provider) that is not one of the service providers of the cloud computing platforms 110-1 through 110-N.

In an embodiment, the defense platform 140 is configured to collect or receive telemetries from, e.g., monitoring systems (not shown in FIG. 1) deployed in each of the cloud platforms 110 and in the data center 120. Based on the received telemetries, a detector (not shown in FIG. 1) deployed in the defense platform 140 is configured to detect potential flood DDoS attacks in the monitored traffic. In an embodiment, the data center 120 may be protected by an in-line detection and mitigation device.

When a potential flood DDoS attack is detected, the traffic is redirected to the defense platform 140. In an example embodiment, the redirection is performed through a DNS configuration as discussed below in an automated fashion, i.e., without requiring a user to reconfigured the DNS entry. In some configurations, the redirection can be triggered by a user.

The defense platform 140 is further configured to "clean" any malicious traffic (data packets) from the received traffic. The cleaned traffic is redirected back to the destination server 165 hosting the protected application 160 that the traffic was originally directed to. The arrangement and operation of the defense platform 140 is further discussed in FIG. 2.

In some optional embodiments, when the attack ends, following a predefined cool-down period set to eliminate attack diversion flipping, the traffic diversion is stopped and traffic is again sent to the destination application directly. This eliminates unnecessary latency throughout the solution lifecycle.

It should be noted that the example implementation shown in FIG. 1 is described with respect to the protected applications hosted in cloud computing platforms 110-1 through 110-N, as well as a single protected data center 120, merely for simplicity purposes and without limitation on the disclosed embodiments. More or fewer cloud computing platforms, data centers, or both, may be protected without departing from the scope of the disclosure. It should be further noted that the disclosed embodiments can operate in multiple-cloud architectures including only two cloud computing platforms or a cloud computing platform and a datacenter. That is, the protected application can be hosted and executed in one or more different and exclusive-mutual platforms.

It should be further noted that two or more defense platforms 140 can be utilized and deployed in the multi-cloud architecture 100.

Figure 2:
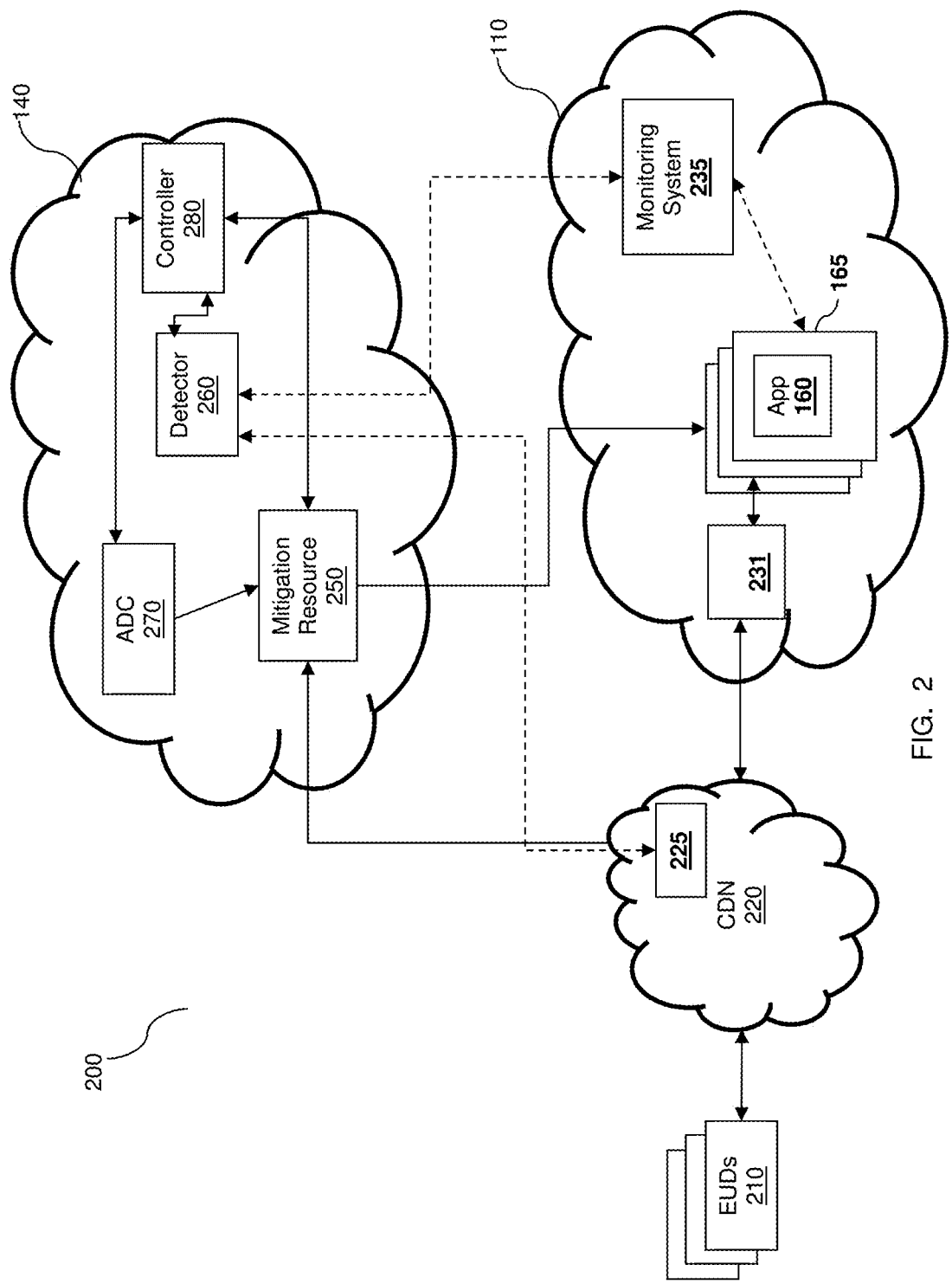
FIG. 2 is a network diagram illustrating deployment of a defense platform according to an embodiment.

FIG. 2 shows an example network diagram 200 utilized to describe the arrangement and operation of the defense platform 140 according to various disclosed embodiments. The example network diagram 200 illustrates a plurality of end-user devices (EUDs) 210, a content delivery network (CDN) 220, a cloud computing platform 110, and the defense platform 140.

The defense platform 140 includes a mitigation resource 250, a detector 260, and a controller 280. It should be noted that the defense platform 140 is separate from the cloud computing platforms 110. In other optional deployments, the defense platform 140 can be part of the public cloud computing platform 110.

In some configurations, the defense platform 140 includes an application delivery controller (ADC) 270. The ADC 270 is configured, among other tasks, to inject clean traffic provided by the mitigation resource 250 back to the cloud computing platform 110.

The EUDs 210 are configured to access a protected application 160 hosted in the cloud computing platform 110 and executed by the servers 165 (FIG. 1). The access to the protected application 160 is through a network, such as the Internet, by means of a web browser or web application and the like installed on a EUD 210. Each of the EUDs 210 may be, but is not limited to, a personal computer, a laptop, a tablet computer, a smartphone, a smart TV, an IoT device, a wearable computing device, or any other device capable of sending and receiving application data.

In an optional deployment, a CDN 220 is communicatively connected between the EUDs 210 and the cloud computing platform 110. The CDN 220 is a system of distributed servers (a network) that deliver webpages and other Web content to a user based on the geographic locations of the user, the origin of the webpage, a content delivery server, and content age and type (static or dynamic).

It should be noted that the EUDs 210, the CDN 220, and the platforms 110 and 140 are all communicatively connected through the Internet, dedicated tunnels or any other communication network. The CDN 220 services can be delivered by the cloud computing platform 110 providers, or by other third-party service providers.

The cloud computing platform 110 may be one of the cloud computing platforms 110-1 through 110-N, or the datacenter 120, discussed in FIG. 1. The cloud computing platform 110 typically includes an edge entity 231 to, for example, load balance the load among the plurality of servers 165. A non-limiting example for an edge entity is a load balancer.

Each cloud computing platform 110 further includes a monitoring system 235 configured to collect telemetries related at least to attributes of traffic coming in to the cloud computing platform 110, going out of the cloud computing platform 110, or both. The monitoring system 235 may further collect other telemetries related to, e.g., utilization of computing resources (e.g., CPU and memory), load balancing web transactions counts and sizes, HTTP response codes metrics, number of requests, number of errors, number of TCP connections and the like. In another implementation (not shown), the monitoring system 235 may be further communicatively connected to the CDN 220 to allow for, e.g., receiving monitoring data (or telemetry) from the CDN 220. It should be noted that multiple instances of monitoring systems may be distributed in the cloud computing platform 110 without departing from the scope of the disclosure.

In an embodiment, the detector 260 in the defense platform 140 is configured to receive or collect one or more of: telemetries, alerts, and logs, that are related at least to traffic between the cloud computing platform 110 and the protected applications 160, from any reliable source regardless of its deployment. In a further embodiment, the detector 260 is configured to receive or collect telemetries from the monitoring system 235, a monitoring system 225 included in the CDN 220, or both. In yet a further embodiment, the detector 260 interfaces with the monitoring system 235 via an application programming interface (API).

The telemetries may be received continuously, at regular intervals (e.g., once per minute), and the like. The telemetries may be related to, but are not limited to, CPU utilization, latency, TCP connections count (new and current connections), a TCP connections size, a HTTP sessions size, layer-7 HTTP methods or verbs count, other request counts, transaction volume, error rate, memory usage, combinations thereof, and the like. The telemetries may be predefined by one or more operators or owners of the cloud computing platform 110.

In another embodiment, the detector 260 is configured to operate as an application layer (layer-7) attack detector by analyzing telemetries related at least to incoming and outgoing traffic flows in order to detect flood HTTP and TCP DDoS attacks. Such analysis is based on the detection of abnormalities in the traffic flows as a deviation from normal applicative behavior. It should be noted that different types of flood DDoS attacks may be detected based on different telemetries. Specifically, the detector 260 is configured to detect TCP flood DDoS and various HTTP flood DDoS attacks. It should be noted that applicative behavior, behavior of the application is determined based on the TCP (transport layer) connections telemetries. The disclosed system does not operate to detect abnormal behavior at the network layer (TCP/IP) layer.

In an embodiment, the detector 260 is also configured to implement at least one detection engine (not shown in FIG. 2) to such attacks based on the received telemetries and features extracted therefrom. The detection engine may be configured to monitor the received telemetries, determine a set of features, and to detect flood DDoS attacks using, for example, a fuzzy logic mechanism, a machine learning based classifier, and the like. A feature is an individual measurable property of a phenomenon being observed. For example, a feature can be a number of HTTP requests per second.

In an embodiment, the detector 260 can implement a single dimension detection, multiple dimension detection, or a combination thereof. The single or multiple dimension detection may be based on features related to rate variant and invariant-based detection of various telemetries received in real-time.

A single dimension detection may include comparing a single feature real time values to a learned normal baseline level. In an example embodiment, the normal baseline level is determined using the monitored telemetries and may represent an average or otherwise normal typical value for the telemetries and the thresholds may represent deviations from the baseline (e.g., based on a predetermined number of standard deviations from the baseline or as a percentage from the baseline).

The multiple dimension detection can be performed using fuzzy logic inference system (FIS) engines to evaluate various features based on their degree of attacks. The detection of flood DDoS attacks using multiple dimension detection is discussed in more detail below.

In an embodiment, the mitigation resource 250 is communicatively connected to the ADC 270. Upon detection of the potential attack, the controller 280 may be configured to cause a DNS diversion from a normal path of traffic from the EUDs 210 to the mitigation resources 250. That is, when the DNS diversion has occurred, instead of flowing the traffic to the protected cloud-hosted application 160, traffic from the EUDs 210 is diverted to the defense platform 140.

The mitigation resource 250 performs one or more mitigation actions on the traffic and forwards legitimate clean traffic back toward the protected application 160 through the ADC 270. That is, the ADC 270 is configured to send clean traffic to the servers 165 (FIG. 1). In some embodiments, the mitigation resource 250 may be, but is not limited to, an "on the cloud" scrubbing center. In another embodiment, the mitigation resource 250 is a multi-tiered mitigation system. An arrangement, configuration and orchestration of a multi-tiered mitigation system is disclosed in U.S. patent application Ser. No. 14/640,814, assigned to the common assignee, which is hereby incorporated by reference.

The controller 280 is configured to control the traffic diversion to and from the platforms 110 and 140 as well all the mitigation functionalities. Specifically, in an embodiment, upon detection of a potential attack, the controller 280 is configured to signal a detected attack to the mitigation resource 250. The controller 280 is further configured to cause DNS traffic redirection from EUDs 210 to the defense platform 140 and, in particular, to the mitigation resource 250. The mitigation resource 250 is configured to clean the traffic by executing one or more mitigation actions, and to send the clean traffic directly to the servers 165 for use by the protected application 160. Alternatively, the clean traffic is provided to the ADC 270, which directs such traffic to servers 165 for use by the protected application 160.

In an embodiment, the DNS traffic redirection (for diverting traffic originally directed to the cloud computing platform 110 to the defense platform 140) includes automatically modifying a DNS record entry to point to a virtual IP (VIP) address representing a resource in the defense platform 140 and not to an IP address of the requested domain hosted in the cloud computing platform 110. For example, a request to a domain "www.mysite.com" would be replaced with "po.mysite.clouddetectorner", where such a fully qualified domain name (FQDN) is identified by a different domain name.

In an embodiment, the mitigation resource 250 may be configured to determine when a previously detected flood DDoS attack is terminated. Upon such determination, the controller 280 returns to a peace mode of operation, i.e., DNS traffic redirection is terminated and the DNS operation is returned to its original operation such that traffic is directed from EUDs 210 directly to their original destination server 165 located at the cloud computing platform 110.

It should be noted that a single defense platform 140 and a single mitigation resource 250 are shown in FIG. 2 merely for simplicity purposes and without limitation on the disclosed embodiments. In some deployments, multiple defense platforms including one or more mitigation resources can be utilized. Such deployments allow for elastic scalability, redundancy, and high availability. Further, as demonstrated in FIG. 1, the disclosed embodiments may be utilized to detect cyber-attacks and mitigate traffic related to multiple cloud computing platforms from multiple public cloud vendors, multiple data centers, or both.

According to the disclosed embodiments, the detection of flood DDoS attacks, such as TCP and HTTP flood attacks, is based on rate-based and rate-invariant features extracted or computed from telemetric data related to the protected applications 160. Specifically, the features are statistically unconditionally related or are not correlated.

In an embodiment, the telemetric data used for detecting flood DDoS attacks may include, for example, a number of HTTP requests (POST and, GET requests, and/or other HTTP verbs) received or processed by the cloud platform (e.g., at an edge entity 231 or the server 165 hosting the protected application); a total number of concurrent active TCP connections established between the EUDs 210 and the edge entity 231 or between the EUDs 210 and the server 165; a total number of new TCP connections established between the EUDs 210 and the edge entity 231 or between the EUDs 210 and the server 165, a total number of bytes processed by the edge entity 231, the server 165, and so on.

In some example embodiments, the features utilized for the multiple dimension detections of HTTP flood attacks are: a request rate (request per second (RPS)), which is rate-based feature, and an average request size (ARS), which is a rate-invariant feature. The request rate is computed as the number of received HTTP requests (e.g., GET, POST, etc.) originating from all clients towards the edge entity 231 and the protected application 160, per second (e.g., requests/sec) or per other period of time (e.g., requests/min). This feature is based on the received telemetric data related to the request count. The request rate is expected to increase during an attack. The average request size is computed as the total number of bytes processed by the edge entity 231, or the protected application 160, divided by the total number of requests (request count). This feature can be increased or decreased during a suspected HTTP flood attack. This allows detecting attacks demonstrating a high request rate causing the ARS to decrease, or a high request rate towards very large web resources (video, pictures and a such) causing the ARS to increase.

It should be noted that while the detector is employed using these features, it will not falsely detect a legitimate high-volume of legitimate application traffic (a flash crowd). For example, during a sales event on an e-commerce website, the RPS (request rate) may increase, but the ARS, average request size, remains the same.

In some example embodiments, the features utilized for the multiple dimension detections of TCP flood attacks include: a rate of new TCP connections, i.e., number of new TCP connections per second (NCPS); a rate of active TCP connections, i.e., a number of concurrent TCP connections per second (ACPS); and an average connection size (ACS). The NCPS and ACPS features are rate-based and the ACS feature is rate-invariant.

Each feature is evaluated by a FIS engine (shown in FIG. 3) that evaluates a degree of fulfilment (DoF) score of each feature. The various DoF scores are further evaluated by an expert system that determines the degree of attack.

Figure 3:
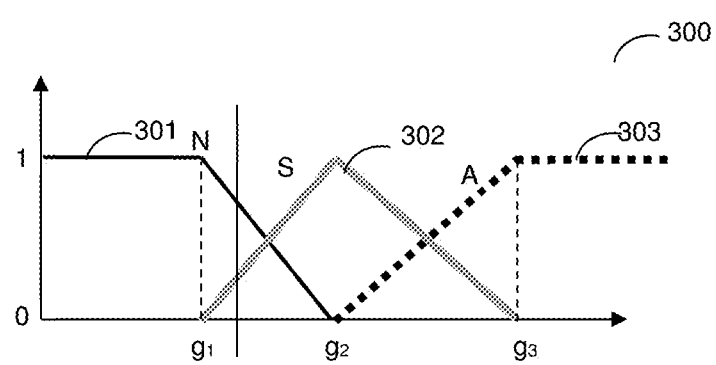
FIG. 3 is an example simulation of an FIS engine utilized to describe multiple-dimension detection according to an embodiment.

As demonstrated in FIG. 3, a FIS engine 300 uses input membership functions for fuzzy analysis for a single feature. In the example shown in FIG. 3, the membership function 301 is a non-attack membership function, the function 302 is a potential attack membership function, and the function 303 is an attack membership function. The membership functions 301, 302, and 303 determine a deterministic score, which is a degree of fulfilment (DoF) of the specific feature. The DoF score defines a behavior group (Attack, Suspicious, Normal) that a set of observed features belong to. The DoF scores are evaluated based on certain "breaking points". Such breaking points are shown as $g_1$ for function 301, $g_2$ for function 302, and $g_3$ for function 303.

The values $g_1$, $g_2$, and $g_3$ are dynamically and adaptively computed based on the received telemetries. For example, any of the values $g_1$, $g_2$, and $g_3$ can be set based on one or more learned baselines. Such baselines may be computed based on moving average telemetries received on the above-mentioned features during a specified time period, such as the last day, week, or month, on an hourly basis. In another embodiment, any of the values $g_1$, $g_2$, and $g_3$ can be computed based on normalized variance of the incoming data (traffic parameters of the defined feature) and the current baseline levels. Examples for computing the baseline levels are discussed in U.S. patent application Ser. No. 15/483,398, assigned to the common assignee, which is hereby incorporated by reference.

According to one embodiment, the FIS engine can be configured to evaluate (fuzzification) each of the features noted above using the appropriate adapted membership function. The result of the evaluation is a DoF score for each feature. The DoF score is scaled to a value between 0 and 1.

In an embodiment, for each moment in time, every graph of a membership function provides three degrees of fulfillment (DoF) scores: DoF for Normal, DoF for Suspicious, and DoF for Attack. The DoF score may be computed as follows: given a graph for a feature and the current value of the feature, a vertical line corresponding to the X coordinate of the feature may be "plotted." As an example, such a computation may result in $DoF^N=0.66$, $DoF^S=0.34$, $DoF^A=0$.

In an embodiment, the FIS engine 300 can be realized through implementation of adaptive algorithms, thereby allowing each detection engine to be continually tuned to fit characteristics of the applicative traffic behavior, i.e., behavior relates to the application. Such adaptive algorithms may include, for example, Infinite Impulse Response (IIR) filters, which continually compute a baseline based on the traffic parameters (e.g., rates of HTTP requests, responses, or both) and modify fuzzy logic breaking points membership functions accordingly. The use of fuzziness for representing the quantitative features monitored for detection of DDoS attacks generally eliminates the abrupt separation of abnormality from normality, providing a measure of the degree of abnormality or normality of a given feature. It should be appreciated that the fuzzy logic techniques allow for automatic detection and then mitigation of attacks, and thus eliminates the need for manual protection policy refinements. Using predefined polices does not provide optimal defense against known and emerging threats.

Example implementation of fuzzy logic engines for detecting traffic attributes related to DDoS and DoS can be found in U.S. Pat. Nos. 7,681,235 and 7,836,496, assigned to the common assignee, which are hereby incorporated by reference.

Figure 4:
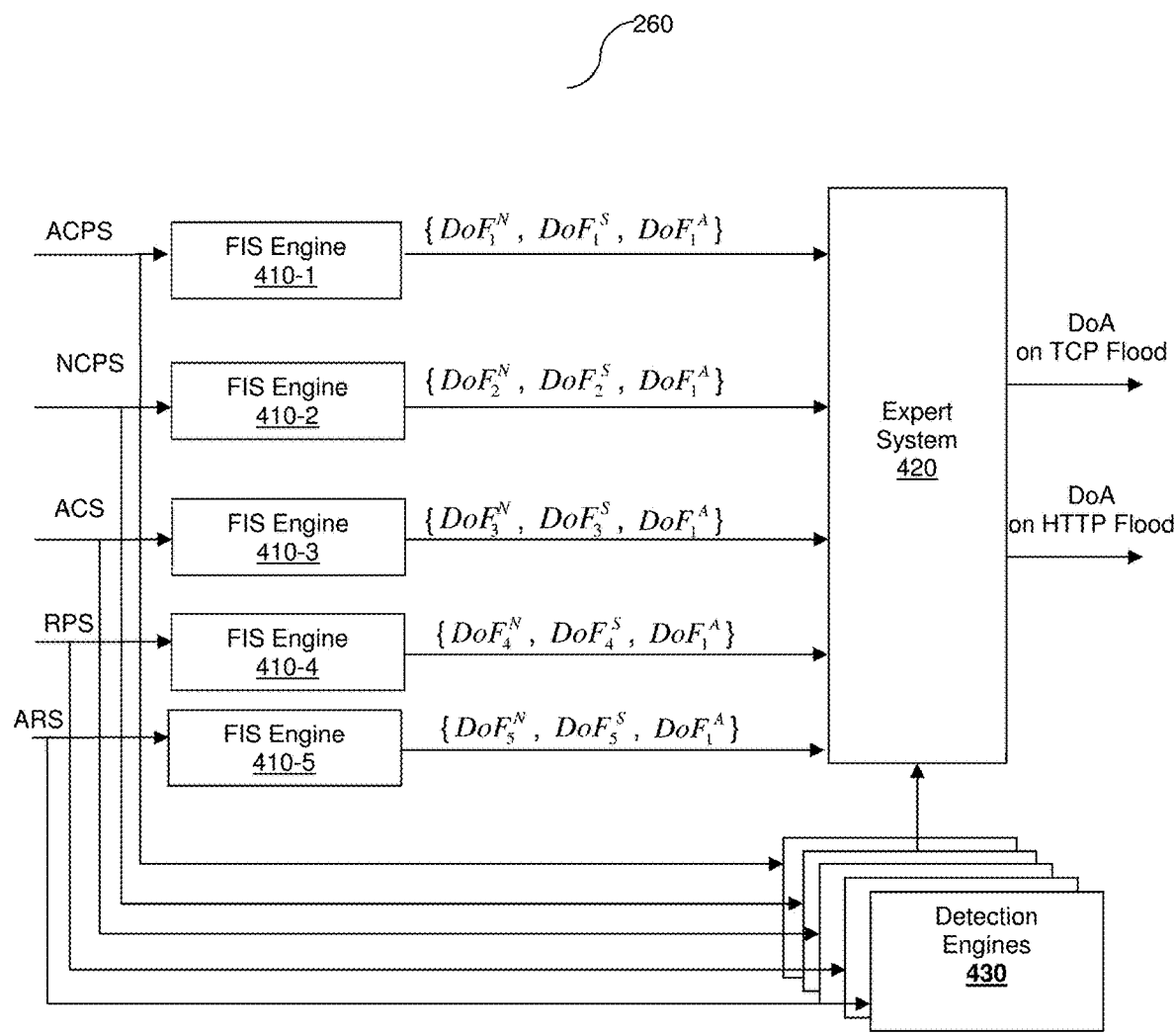
FIG. 4 is a block diagram of a detector for detecting flood DDoS attacks according to an embodiment.

FIG. 4 shows an example block diagram of the detector 260 according to an embodiment. The detector 260 includes FIS engines 410-1 through 410-5, each of which is implemented as the FIS engine 300 (FIG. 3). In an embodiment, the FIS engines 410-1, and 410-3 respectively determine if the CPS and ACS features demonstrate normal or abnormal behavior and are utilized in the detection of TCP flood attacks. In an embodiment, the FIS engines 410-2 and 410-3 respectively determine if the NCPS and ACS features demonstrate normal or abnormal behavior and are utilized in the detection of TCP flood attacks with higher granularity. In an embodiment, the FIS engines 410-4 and 410-5 determine if the RPS and ARS features (or the new HTTP request per second and ARS features), respectively, demonstrate normal or abnormal behavior and are utilized in the detection of HTTP flood attacks. It should be noted that the detector 260 can be configured to detect only HTTP flood attacks, only TCP flood attacks, or both.

The detector 260 also includes an expert system 420, and optionally one or more detection engines 430. Each detection engine 430 operates as a single-dimension detector based on a single feature and its on-going calculated normal baseline level.

Figure 6:
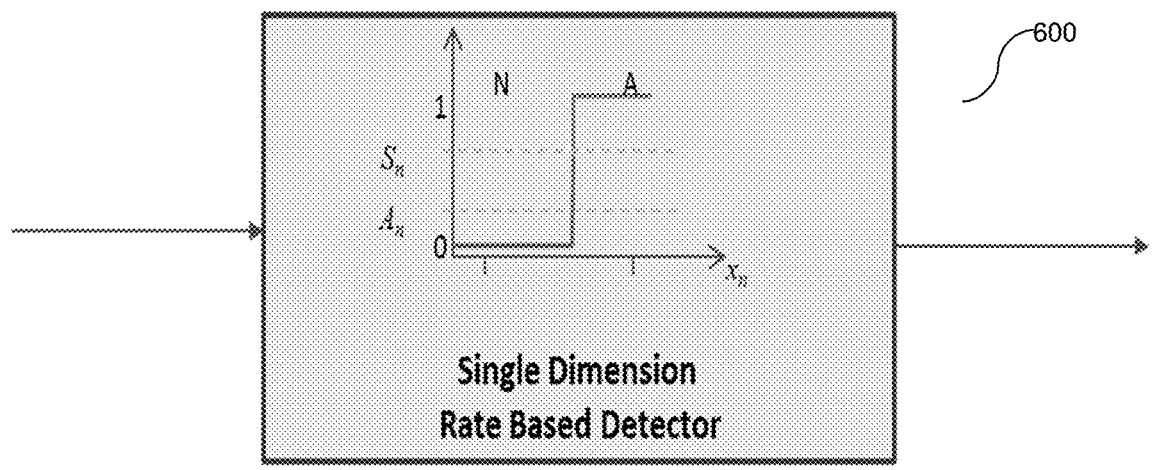
FIG. 6 is a simulation illustrating a single-dimension detection.

As shown in the example simulation 600 shown in FIG. 6, in a single dimension detection, a feature value is validated against one or more normal baseline levels. Detection is based on exceeding the baseline levels for a certain amount of time. To this end, the detection engine 430 may be configured to automatically compute the normal baseline levels based on monitored features (e.g., over a specified time period, such as the last day, week, or month, on an hourly basis), where potential flood DDoS attacks are detected based on deviations from the normal baseline levels. In an embodiment, the baseline levels may include high and low levels such that an attack is detected as starting once the high levels has been surpassed for a predetermined period of time and as ending once the telemetric value falls below the low level for a predetermined period of time. Deviation from the baseline can be manually defined as a percentage (or by others) or can be automatically set, for example as 4 times the standard deviation (STD).

Returning to FIG. 4, the expert system 420 is configured to determine a degree of attack (DoA) score based in part on the DoF scores fed from the FIS engines 410. As noted above, each FIS engine 410 operates on a specific feature and outputs a set of DoF scores $\{DoF_i^N, DoF_i^S, DoF_i^A\}$ representing normal, suspicious, and attack activity.

In an embodiment, the expert system 420 first computes maximal DoF scores $\{DoF^N, DoF^S, DoF^A\}$ over the respective values $\{DoF_i^N, DoF_i^S, DoF_i^A\}$ output by the engines 410-1 and 410-3 (i=1 and 3) and by engines 410-2 and 410-3 (i=2 and 3) for TCP Floods and output by the engines 410-4, 410-5, and 410-3 (i=3, 4, and 5) for HTTP Floods. In this embodiment, the computation is performed as follows for each type of attacks:

$$\begin{cases} DoF^N = \max_{\forall i}(DoF_i^N) \\ DoF^S = \max_{\forall i}(DoF_i^S) \\ DoF^A = \max_{\forall i}(DoF_i^A) \end{cases} \quad \text{Eq. 1}$$

Then, based in part on the maximum DoF scores, the DoA score is determined by the expert system 420. In an embodiment, the DoA score is computed as follows:

$$DoA = 2\frac{9 - (1 - DoF_N)^2 - 3(1 - DoF_S)^2 - 5(1 - DoF_A)^2}{3 - (1 - DoF_N)^2 - (1 - DoF_S)^2 - (1 - DoF_A)^2} \quad \text{Eq. 2}$$

The determined DoA is compared to a predefined threshold, where any DoA score exceeding this threshold would trigger an alert or a signal that a flood HTTP and/or TCP DDoS attack has been detected. In an optional embodiment, inputs fed from the detection engines 430 are also considered by the expert system 420 if and when an alert is triggered. In an alternative embodiment, only inputs from engines 410 are considered. Alternatively, or collectively, the inputs from the detection engines 430 may be utilized for the detections. Such inputs would be triggered upon crossing one or more normal baseline levels. It should be appreciated that in some embodiments, one, some, or all of the features can be considered in the DoA determination. As mentioned above, the detection engines would not detect high volume traffic (flash crowd) demonstrated by an increase in the RPS and no change in the ARS as DDoS attacks. As such, false positive indications in cases of legitimate flash crowd scenarios would not be reported.

The operation for the expert system 420 can be considered as evaluating the behavioral changes in the monitored features. For example, behavioral changes showing an increase in the request rate (RPS) and a decrease, or an increase, in the average request size (ARS) would be indicative of a HTTP flood attack.

As another example, behavioral changes showing an increase in the rate of ACPS and an increase, or a decrease, in the ACS, would be indicative of a TCP flood attack. In yet another example, behavioral changes showing an increase in the NCPS and an increase, or a decrease, in the ACS, would be indicative of a TCP flood attack. For both examples, behavioral changes showing an increase in the ACPS and an increase in the NCPS while the ACS remains the same, would be indicative of a non-TCP flood attack and treated as legitimate activity, i.e. flash crowd scenarios.

It should be appreciated that the detector 260 operating as discussed above can be utilized to detect flood DDoS attacks, and in particular HTTP flood and TCP flood types of attacks. For example, an HTTP flood attack is executed by initiating many HTTP requests, while a low volume of data is sent over these attack sessions. Thus, detecting an increase in the request rate (RPS) and a decrease in average request size (ARS) would likely be indicative on an HTTP flood DDoS attack.

As another example, a TCP flood attack is executed by initiating many TCP connections with a victim server. Limited data is sent over these TCP connections. Thus, detecting an increase in the new TCP connection rate (NCPS) and/or active TCP connection rate (ACPS), while a decrease in average connection size (ACS) would likely be indicative on a TPC flood DDoS attack.

Therefore, by implementing the disclosed embodiments, the detector 260 provides an out-of-path (OOP) detection of attacks committed against protected cloud applications hosted in a multi-cloud architecture against at least flood DDoS attacks.

In some embodiments, the detector 260 can be utilized to detect flood DDoS attacks using "single dimension" detection by baselining the real-time values of each feature and comparing the baseline with the real-time values.

The features that can be measured and utilized in the single dimension and evaluated by the detection engines 430 are the HTTP request rate (RPS) for HTTP flood detection and the average request size (ARS), and new TCP connections rate (NCPS) and active TCP connections rate (ACPS) and average connection size (ACS) for TCP flood detection. In some embodiments, a number of baseline levels are determined, each of which defines a different severity of an attack. The baseline levels may be set after a predefined learning period and continuously updated.

Figure 7:
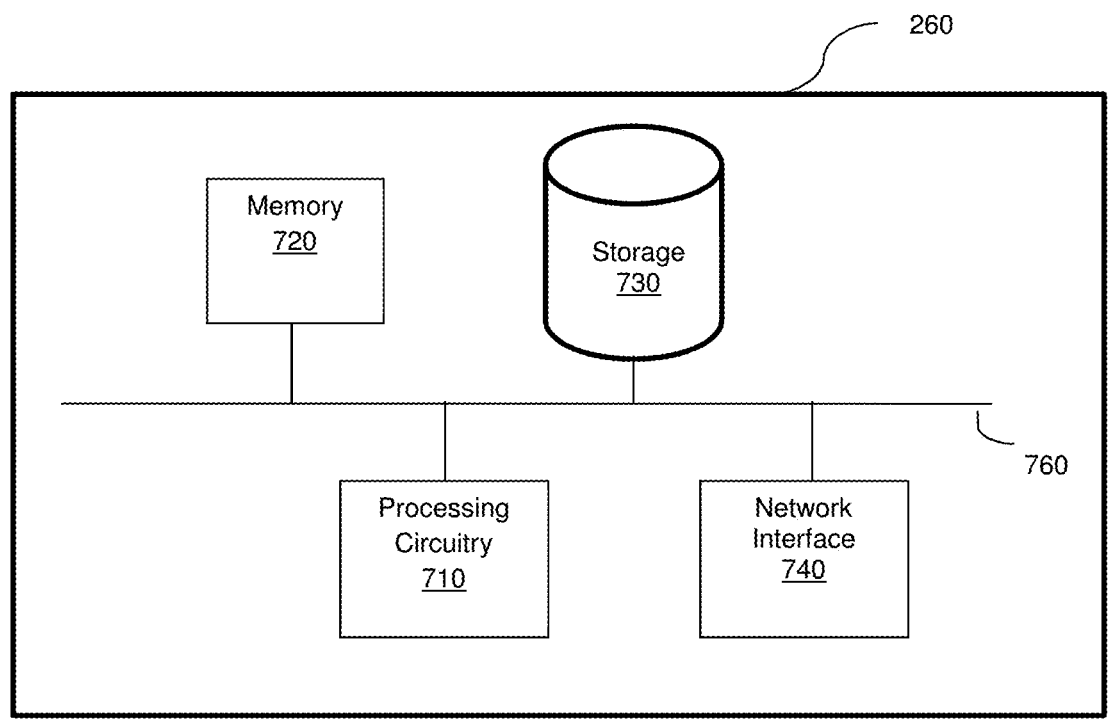
FIG. 7 is a schematic diagram illustrating a detector according to an embodiment.

The various elements of the detector 260 as illustrated in FIG. 4 can be realized using one or more processing circuitries as shown, for example, in FIG. 7.

Figure 5:
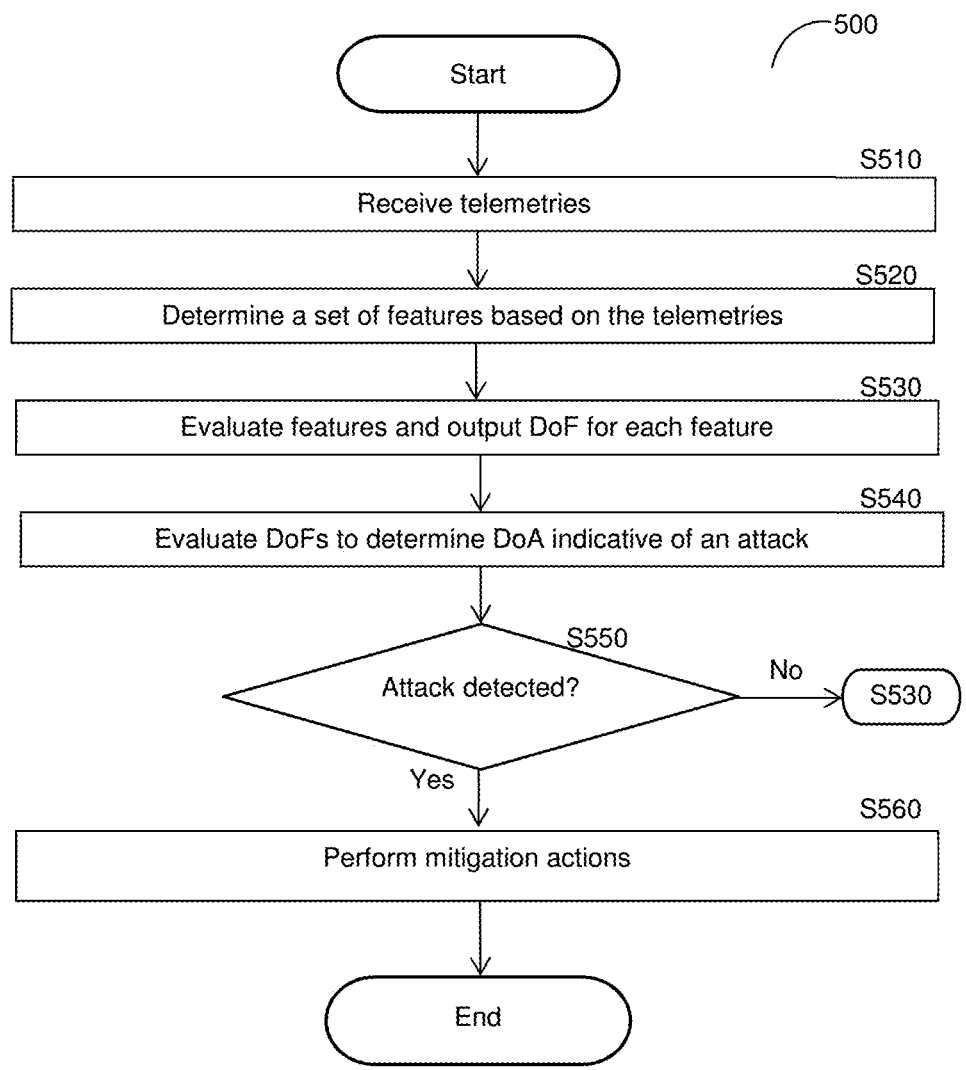
FIG. 5 is a flowchart illustrating a method for detecting and mitigating flood DDoS attacks according to an embodiment.

FIG. 5 is an example flowchart 500 illustrating a method for out-of-path detection and mitigation of flood DDoS attacks executed against protected applications hosted in a multi-cloud architecture according to an embodiment.

At S510, telemetries are received at a defense platform located out-of-path with respect to the protected applications. The telemetries may be received as telemetries from a plurality of monitoring systems deployed in a plurality of public clouds, on-premises locations, or both, where each monitoring system is configured to monitor at least traffic related to at least one protected application. The telemetries may be received continuously, at predetermined time intervals (e.g., once every minute), and the like.

In an embodiment, telemetries include data on at least a total number of concurrently active TCP connections; a total number of new TCP connections; a total number of bytes processed by an edge entity, or by the protected application 160, in the cloud platform, a number of HTTP requests (POST, GET, etc.) initiated by all EUDs to the cloud applications, and so on.

In an embodiment, the telemetries are aggregated per protected application. Further, telemetries received on different applications belonging to the same tenant may be aggregated and considered during the detection. Such applications can be executed in different cloud computing platforms, data centers, or both. Thus, the received telemetries can be sourced from different resources, like monitoring and telemetry system and such.

At S520, the received telemetries are processed to determine, extract, and otherwise compute a set of at least rate-based and rate-invariant features that are utilized for the detection of flood DDoS attacks. As discussed above, the set of features includes at least one of RPS, ARS, ACPS, NCPS, and ACS.

At S530, a plurality of features is evaluated by an FIS engine configured to determine if the respective feature represents a normal or abnormal behavior. The evaluation may be performed using membership functions discussed in detail above. The output of each FIS engine includes DoF scores related to normal, suspicious, and attack traffic, respectively. Alternatively or collectively, each feature of the above-mentioned features can be evaluated by a single dimension detectors.

At S540, the DoF scores are further evaluated by an expert system to determine a DoA score. The DoA score is indicative of a potential attack. In an embodiment, to detect flood DDoS attacks, the evaluation the various features and their respective DoFs' scores are performed to detect an increase in the connections rate (new and/or active) with a decrease or an increase in the average connection size. Various examples for evaluation such rate and rate-invariant features are discussed above.

It should be noted that the realization of S530 and S540 is not limited to FIS engines and expert systems. In some configuration, the detection of a potential attacks based on the set of features can be performed using, for example, single dimension detection engines, machine-learning classifiers, and the like.

In an embodiment, the detection in S530 and S540 may be a combination of multiple dimension detection using FIS engines and single dimension detection using one or more detection engines 430. Each engine operates on a single feature from the entire feature set.

At S550, it is checked if an attack potentially exists based on the value of the DoA score. In an embodiment, S550 includes comparing the DoA score to a predefined threshold. If so, at S560, a detection signal is trigged to cause, for example, execution of at least one mitigation action; otherwise, execution returns to S530.

At S560, when a potential attack has been detected, at least one mitigation action is performed. In an embodiment, S560 may include causing redirection of traffic from a source of the traffic to a mitigation resource. The traffic redirection can be achieved using, for example, DNS redirection.

In an embodiment, the mitigation resource cleans the traffic by removing malicious traffic and sends the clean traffic to at least one server hosting the protected application. In another embodiment, the mitigation action includes automatic configuration of ACLs in the cloud computing platform to prevent direct access to the protected application. The configuration is performed using, for example, APIs.

In some embodiments, when it is determined if it is safe to return to a peace mode of operation, traffic is redirected directly to a destination server hosting the protected application in a cloud platform rather than being routed through the mitigation resource in the defense platform. Such determination can be performed using, for example, an input received from an external system (not shown) or an indication received by monitoring traffic entering the mitigation resource, the defense platform, or both.

FIG. 7 is an example block diagram of the detector 260 according to an embodiment. The detector 260 includes a processing circuitry 710 coupled to a memory 720, a storage 730, and a network interface 740. In an embodiment, the components of the detector 260 may be communicatively connected via a bus 760.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 710 to perform the various processes described herein. Specifically, the instructions, when executed, cause the processing circuitry 710 to perform out-of-path detection and mitigation of cyber-attacks, including flood DDoS attacks, as discussed hereinabove. In a further embodiment, the memory 720 may further include a memory portion including the instructions.

The storage 730 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 730 may store communication consumption patterns associated with one or more communications devices.

The network interface 740 allows the detector 260 to communicate with the monitoring systems in order to receive telemetries and alerts related to traffic behavior. The network interface 740 further allows the detector 260 to communicate with the various networks.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for protecting cloud-hosted applications against hypertext transfer protocol (HTTP) flood distributed denial-of-service (DDoS) attacks, the method being performed by a defense system that is deployed out-of-path and comprising:
    collecting telemetries from a plurality of sources deployed in at least one cloud computing platform hosting at least one protected cloud-hosted application, the telemetries related at least to attributes of traffic coming in to the cloud computing platform;
    determining at least one rate-based feature and at least one rate-invariant feature based on the collected telemetries, wherein the rate-based feature and the rate-invariant feature indicate behavior of at least HTTP traffic directed to the at least one protected cloud-hosted application;
    determining, based on the at least one rate-based feature and the at least one rate-invariant feature together, whether the behavior of the at least HTTP traffic indicates a potential HTTP flood DDoS attack against the at least one protected cloud-hosted application; and
    causing execution of a mitigation action when an indication of a potential HTTP flood DDoS attack against the at least one protected cloud-hosted application is determined.

2. The method of claim 1, wherein the at least one cloud computing platform further includes one or more on-premises locations.

3. The method of claim 1, wherein the at least one protected cloud-hosted application is hosted in a plurality of cloud computing platforms of different vendors that includes one on-premises locations.

4. The method of claim 1, wherein the collected telemetries include at least one of: a number of HTTP methods requests originating from all end-user devices currently accessing the at least one protected cloud-hosted application, a number of processed bytes of HTTP traffic directed to the at least one protected cloud-hosted application.

5. The method of claim 4, wherein the least one rate-based feature is at least a number of HTTP requests per second (RPS) directed to the at least one protected cloud-hosted application and the rate-invariant feature is at least an average size of HTTP requests (ARS) directed to the at least one protected cloud-hosted application.

6. The method of claim 1, wherein determining whether the behavior of the at least HTTP traffic indicates a potential HTTP flood DDoS attack based on the at least one rate-based feature and the at least one rate-invariant feature together further comprises:
    developing, using a fuzzy logic inference engine, a normal degree of fulfillment (DoF) score, a suspicious DoF score, and an attack DoF score.

7. The method of claim 6, further comprising:
    developing, using an expert system, a degree of attack (DoA) score based on the maximum DoF scores computed for the normal DoF score, the suspicious DoF score and the attach DoF score; and
    comparing the DoA score to a predefined threshold, wherein an indication of a potential HTTP flood DDoS attack is determined when the DoA score exceeds the predefined threshold.

8. The method of claim 7, wherein the DoA score indicates a potential HTTP flood DDoS attack when the at least one rate-base feature demonstrates an increase and the at least one rate-invariant feature demonstrates a decrease or an increase.

9. The method of claim 1, wherein causing execution of a mitigation action further comprises:
- redirecting traffic destined to the at least one protected cloud-hosted application to a mitigation resource for at least cleaning the traffic; and
- sending the clean traffic to the destined protected cloud-hosted application.

10. The method of claim 9, wherein the mitigation resource is out-of-path from the at least one cloud computing platform hosting the at least one protected cloud-hosted application.

11. A non-transitory computer readable medium having stored thereon instructions for causing processing circuitry of a defense system that is deployed out-of-path to perform a method for protecting cloud-hosted applications against hypertext transfer protocol (HTTP) flood distributed denial-of-service (DDoS) attacks, the method comprising:
- collecting telemetries from a plurality of sources deployed in at least one cloud computing platform hosting at least one protected cloud-hosted application, the telemetries related at least to attributes of traffic coming in to the cloud computing platform;
- determining at least one rate-based feature and at least one rate-invariant feature based on the collected telemetries, wherein the rate-based feature and the rate-invariant feature indicate behavior of at least HTTP traffic directed to the at least one protected cloud-hosted application;
- determining, based on the at least one rate-based feature and the at least one rate-invariant feature together, whether the behavior of the at least HTTP traffic indicates a potential HTTP flood DDoS attack against the at least one protected cloud-hosted application; and
- causing execution of a mitigation action when an indication of a potential HTTP flood DDoS attack against the at least one protected cloud-hosted application is determined.

12. A defense system for protecting cloud-hosted applications against hypertext transfer protocol (HTTP) flood distributed denial-of-service (DDoS) attacks, the defense system being deployed out-of-path and comprising:
- a processing circuitry; and
- a memory connected to the processor, the memory contains instructions that when executed by the processing circuitry, configure the system to:
- collect telemetries from a plurality of sources deployed in at least one cloud computing platform hosting at least one protected cloud-hosted application, the telemetries related at least to attributes of traffic coming in to the cloud computing platform;
- determine at least one rate-based feature and at least one rate-invariant feature based on the collected telemetries, wherein the rate-based feature and the rate-invariant feature indicate behavior of at least HTTP traffic directed to the at least one protected cloud-hosted application;
- determine the at least one rate-based feature and the at least one rate-invariant feature together, whether the behavior of the at least HTTP traffic indicates a potential HTTP flood DDoS attack against the at least one protected cloud-hosted application; and
- cause execution of a mitigation action, when an indication of a potential HTTP flood DDoS attack against the at least one protected cloud-hosted application is determined.

13. A method for protecting cloud-hosted applications against transmission control protocol (TCP) flood distributed denial-of-service (DDoS) attacks, the method being performed by a defense system that is deployed out-of-path and comprising:
- collecting telemetries from a plurality of sources deployed in at least one cloud computing platform hosting at least one protected cloud-hosted application, the telemetries related at least to attributes of traffic coming in to the cloud computing platform;
- determining at least one rate-based feature and at least one rate-invariant feature based on the collected telemetries, wherein the rate-based feature and the rate-invariant feature indicate behavior of at least TCP connections established with a server hosting the at least one protected cloud-hosted application;
- determining, based on the at least one rate-based and the at least one rate-invariant feature together, whether their behavior indicates a potential TCP flood DDoS attack against the at least one protected cloud-hosted application; and
- causing execution of a mitigation action, when an indication of a potential TCP flood DDoS attack against the at least one protected cloud-hosted application is determined.

14. The method of claim 13, wherein the at least one cloud computing platform further includes one or more on-premises locations.

15. The method of claim 13, wherein the protected cloud-hosted application is hosted in a plurality of cloud computing platforms of various vendors that includes one or on-premises locations.

16. The method of claim 13, wherein the collected telemetries include at least one of: a new TCP connections count, a concurrent active TCP connections count, a number of processed bytes of TCP connections directed to the protected by the cloud-hosted application.

17. The method of claim 16, wherein the at least one rate-base feature is any one of: a number of new TCP connections per second (NCPS); a number of concurrent TCP connections per second (ACPS), and wherein the at least one rate-invariant feature is at least an average TCP connection size (ACS).

18. The method of claim 13, wherein determining whether the behavior of the at least HTTP traffic indicates a potential TCP flood DDoS attack based on the at least one rate-based feature and the at least one rate-invariant feature together further comprises :
- developing , using a FIS engine, a normal degree of fulfillment (DoF) score, a suspicious DoF score, and an attack DoF score.

19. The method of claim 18, further comprising:
- developing , using an expert system, a degree of attack (DoA) score based on the maximum DoF scores computed over all the DoF scores of all features; and
- comparing the DoA score to a predefined threshold, wherein an indication of a potential TCP flood DDoS attack is determined when the DoA score exceeds the predefined threshold.

20. The method of claim 19, wherein the DoA score indicates the potential TCP flood DDoS attack when the at least one rate-base feature demonstrates an increase and the at least one rate-invariant feature demonstrates an increase or a decrease.

21. The method of claim 13, wherein causing execution of a mitigation action further comprising:
- redirecting traffic destined to the at least one protected cloud-hosted application to a mitigation resource for at least cleaning the traffic; and sending the clean traffic to the destined protected cloud-hosted application.

22. The method of claim 21, wherein the mitigation resource is out-of-path from the at least one cloud computing platform hosting the at least one protected cloud-hosted application.

23. A non-transitory computer readable medium having stored thereon instructions for causing processing circuitry of a defense system that is deployed out-of-path to perform a method for protecting cloud-hosted applications against transmission control protocol (TCP) flood distributed denial-of-service (DDoS) attacks comprising:

collecting telemetries from a plurality of sources deployed in at least one cloud computing platform hosting at least one protected cloud-hosted application, the telemetries related at least to attributes of traffic coming in to the cloud computing platform;

determining at least one rate-based feature and at least one rate-invariant feature based on the collected telemetries, wherein the rate-based feature and the rate-invariant feature indicate behavior of at least TCP connections established with a server hosting the at least one protected cloud-hosted application;

determining, based on the at least one rate-based and the at least one rate-invariant feature together, whether their behavior indicates a potential TCP flood DDoS attack against the at least one protected cloud-hosted application; and causing execution of a mitigation action, when an indication of a potential TCP flood DDoS attack against the at least one protected cloud-hosted application is determined.

24. A defense system for protecting cloud-hosted applications against transmission control protocol (TCP) flood distributed denial-of-service (DDoS) attacks, the defense system being deployed out-of-path and comprising:

a processing circuitry; and a memory connected to the processor, the memory contains instructions that when executed by the processing circuitry, configure the system to:

collect telemetries from a plurality of sources deployed in at least one cloud computing platform hosting at least one protected cloud-hosted application, the telemetries related at least to attributes of traffic coming in to the cloud computing platform;

determine at least one rate-based feature and at least one rate-invariant feature based on the collected telemetries, wherein the rate-based feature and the rate-invariant feature indicate behavior of at least TCP connections established with a server hosting the at least one protected cloud-hosted application;

determine the at least one rate-based and the at least one rate-invariant feature together, whether their behavior indicates a potential TCP flood DDoS attack against the at least one protected cloud-hosted application; and cause execution of a mitigation action, when an indication of a potential TCP flood DDoS attack against the at least one protected cloud-hosted application is determined.

* * * * *